DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1346

T882,019

PHOTOGRAPHIC MATERIALS CURVE SHAPE STABILIZED WITH CARBOXY SUBSTITUTED 4-THIOURACILS

Thomas Irving Abbott, % Eastman Kodak Co., Kodak Park Division, Rochester, N.Y. 14650

Filed May 14, 1970, Ser. No. 37,323

Int. Cl. G03c *1/34, 1/76, 1/28*

U.S. Cl. 96—109

No Drawing. 30 Pages Specification

Photographic layers, emulsions and elements comprising them are stabilized against color balance distortion by addition of carboxy substituted 4-thiouracils. Specific examples of stabilizers include 1-carboxyalkyl 5(H)-cyclopenta-(d)-4-thiouracil. Silver halide-containing layers, emulsions and elements so stabilized can be chemically sensitized, e.g., with noble metal sensitizers alone or in combination with sulfur, selenium or tellurium. They can contain spectral sensitizers, incorporated color forming couplers, incorporated developing agents, antifoggants, hardeners, plasticizers, coating aids and other suitable photographic addenda such as described in U.S. Pat. 3,297,446 issued to Dunn on Jan. 10, 1967 (columns 4 to 9). Likewise, the silver halide grains can be prepared as converted halides or as simple halides.